United States Patent Office 3,803,241
Patented Apr. 9, 1974

3,803,241
PROCESS FOR THE CATALYTIC FLUORINATION OF SATURATED AND UNSATURATED HALOGENATED HYDROCARBONS
Ignacio Stolkin, Doebendorf, Switzerland, and Hans-Joachim Kotzsch, Rheinfelden, Germany, assignors to Dynamit Nobel Aktiengesellschaft, Troisdorf, Germany
No Drawing. Filed Mar. 2, 1970, Ser. No. 18,812
Claims priority, application Germany, Mar. 1, 1969, P 19 10 529.4
Int. Cl. C07c 23/08, 49/08
U.S. Cl. 260—593 H       9 Claims

ABSTRACT OF THE DISCLOSURE

Improvements in the fluorination of halogenated hydrocarbons containing at least two carbon atoms by using a catalyst which is γ or η aluminum oxide containing 1 to 15% chromium, 6 to 18% oxygen, 42 to 59% fluorine and by carrying out the hydrofluorination process with excess hydrogen fluoride at 140 to 400° C. and with residence times of 1 to 40 seconds.

---

The catalytic hydrofluorination of chlorinated hydrocarbons, both in the gas phase and in the liquid phase, is generally known. In such processes the chlorine substituents are partially or entirely replaced by fluorine. It is also in the prior art to catalyze these reactions with a material which contains aluminum oxide and chromium oxide. It is known that these hydrofluorination methods can be applied to some extent to halogenated hydrocarbons which have two or more carbon atoms.

The disadvantages of these known catalytic hydrofluorination methods lie in the excessively low activity of the catalysts. In spite of high reaction temperatures, the yields of fluorinated compounds are far below the stoichiometric values, and the fluorination products are contaminated with starting substances. In some cases, contamination is partially fluorinated intermediate products. The preparation of pure end products requires a large investment in purification.

For the preparation of fluorinated hydrocarbons, including some containing chlorine, by the fluorination of chloroethylene, catalysts have been proposed which consist of untreated aluminum oxide that has been impregnated with chromium halide and, after drying, has been fluorinated in the presence of water vapor at temperatures of 250 to 300° C.

The use of these catalysts is disadvantageous in that reaction temperatures during the hydrofluorination are required to range between 250° C. and 400° C. These temperatures are unfavorable for most starting materials, including chlorinated hydrocarbons, such as those having 2 or more carbon atoms, and give rise to undesired decomposition reactions, e.g., the cleavage of carbon-to-carbon bonds, resulting in halogen hydrides, carbonization, etc. Such decomposition reactions take place on the surface of the catalyst with the formation and deposition of carbon, thereby inactivating the catalyst. The life of these known catalysts is therefore very short, so that even after only a few days of use they have to be regenerated.

This regeneration is performed, according to prior art methods, by heating with air at 500 to 600° C. The regeneration is carried out for several days. These high temperatures, which are about incandescent temperatures and which may be accompanied by even greater local overheating, further damage the catalyst, as for example by sintering which may occur in the active surface, or by thermal stress reversals in the mechanical bond. This causes a certain amount of powdering of catalyst components which can lead to a partial or total clogging of the equipment and thus imperil the continuity of the operation.

Another disadvantage of the prior art processes is the extremely high concentration of hydrofluoric acid that is used in them in order to achieve sufficiently high yields. The recovery of the hydrofluoric acid can be accomplished only at great technical expense. Even if it is desired merely to discard the excess hydrogen fluoride, considerable technological problems are involved in rendering it harmless in an economical manner.

According to this invention, a process has been discovered for the hydrofluorination of saturated or unsaturated halogenated hydrocarbons having 2 or more carbon atoms, which may or may not additionally contain a carbonyl group, which is characterized by the fact that the hydrofluorination is performed with excess hydrogen fluoride at temperatures between 140° and 400° C., and at reactant residence times between 1 and 40 seconds, on a catalyst which consists of γ- or η-aluminum oxide roasted at about 80° C. in a vacuum of less than 1 mm. Hg and containing 1 to 15% by weight of chromium, 6 to 18 wt.-percent oxygen and 42–59 wt.-percent fluorine, with reference to the $Al_2O_3$. The coating of the aluminum oxide surface with chromium and fluorine is performed by heating the aluminum oxide at about 80° C. in a vacuum of less than 1 mm. Hg, then impregnating it with a chromium salt solution, and then fluorinating it with hydrogen fluoride at temperatures up to 250° C. with slowly diminishing amounts of air, until the exothermic reaction ceases.

Particularly good results are achieved when a catalyst is used which contains between 1 and 5 wt.-percent chromium, 7 to 10 wt.-percent oxygen and 54 to 58 wt.-percent fluorine, with reference to the $Al_2O_3$.

The catalyst is prepared by heating η or γ aluminum oxide for about one hour at temperatures between 50° C. and 120° C., preferably 80° C., in a vacuum of less than 1 torr. Cooling down to room temperature is also performed under the vacuum. Thereupon the aluminum oxide is impregnated with a chromium salt solution, the aqueous phase is drawn off, and the catalyst composition is given a preliminary drying in the vacuum of a water-jet pump. The final drying is performed at temperatures up to 150° C. Then the catalyst is activated by passing hydrogen fluoride through it. At the beginning of this activation the hydrogen fluoride is diluted with air. As the activation progresses, the gas mixture has increasing hydrogen fluoride concentrations provided that the proportions are maintained such that the temperature does not exceed 250° C. After the gas has been made 100% HF, the activation is continued for another two hours.

A good chromium salt solution to use is solution of $CrCl_3 \cdot 6H_2O$; however, other water-soluble chromium salts can be used which produce a stable aqueous solution, such as chromium (III) sulfate or chromium (III) nitrate. However, water-soluble chromates or dichromates can be used, too, such as ammonium chromate, potassium chromate or potassium dichromate, for example.

The hydrofluorination reaction is performed by mixing the halogenated hydrocarbons with excess hydrogen fluoride in the gaseous phase in the required molar ratio, preheating the mixture to the required reaction temperature, and passing the mixture over the catalyst heated to the reaction temperature. The hydrogen fluoride excess amounts to 1 to 50 mole-percent, preferably 2 to 15 mole-percent of the stoichiometrically required amount, with refeernce to the halogenated hydrocarbon. The catalyst can be either in a fluidized bed or in a solid bed.

Aliphatic and cycloaliphatic, saturated and unsaturated halogenated hydrocarbons having two or more carbon atoms can be hydrofluorinated by the process of the invention. Examples of aliphatic, unsaturated halogenated hydrocarbons are the following: vinyl chloride, vinyl fluoride, allyl chloride, 1,1-dichloroethylene, 1,1-difluorethylene, 1,1,2-trichloroethylene and perchloroethylene.

Examples of saturated halogenated hydrocarbons are: 1,1,1-trichlorethane, 1,1,2-trichlorethane, etc. The following are examples of cyclic halogenated hydrocarbons: hexachlorocyclopentadiene, pentachlorocyclopentadiene, etc.

Halogenated ketones, such as hexachloracetone, difluorotetrachloracetones, trifluorotrichloracetones, tetrafluorodichloracetones and pentafluorochloracetone, for example, can be hydrofluorinated by the present process.

One special advantage of the new process is the high activity of the catalyst prepared according to the invention, when used at the relatively low reaction temperatures at which the halogenated hydrocarbons used for the hydrofluorination reaction are still sufficiently stable, especially the chlorinated hydrocarbons. Therefore, the coking of the catalyst, which was a principal disadvantage of the methods known hitherto, occurs only to a minimal extent in the process of the invention, and does not impair the reaction.

The short residence times used in this new process also have a favorable effect on the active lift of the catalyst, so that it does not have to be regenerated until after at least 250 hours of operation, though as a rule the active life amounts to 1000 hours.

Additional advantages of the new process are the very high throughputs of the reaction components and the virtually quantitative yields of pure fluorinated hydrocarbons containing scarely any reactants or intermediate products. The regeneration of the catalyst is performed simply by passing air through it at temperatures of 200 to 300° C.

The products prepared by the process of the invention, such as 1,1-difluorethane and 1,1,1-trifluorethane, are suitable, for example, as coolant liquids, and are valuable intermediates in organic chemistry and in polymer chemistry.

Without limiting the scope hereof, the invvention is illustrated by the following examples.

EXAMPLE 1

2 liters of aluminum oxide in pellets of 3 mm. diameter are heated to 80° C. in a glass tube equipped with a heating jacket, and the tube is evacuated to $10^{-2}$ torr for one hour. The tube is cooled to room temperature while still evacuated, and an aqueous solution of 31 wt.-percent $CrCl_3.6H_2O$ is let flow into the tube. Then the charge is exposed to air, and after one hour of standing at 80° C., the aqueous phase is drawn off and the catalyst composition preliminarily dried in the vacuum of a waterjet pump.

One liter of the catalyst is placed in a reactor tube of nickel having a 50 mm. diameter and a 1500 mm. length. The reactor is heated to a length of 1300 mm. in an electric oven. At 200° C., the catalyst is thoroughly dried by passing nitrogen or air through it, and then it is treated with a variable proportion mixture of air and hydrogen fluoride. The concentration of the hydrogen fluoride is increased but maintained so that the temperature does not exceed 250° C. After a 100% HF current is achieved, the treatment is continued for another 2 hours, and then the final drying is performed with air for one hour. The fluorine content of the catalyst then amounts to about 54% by weight and the chromium content to about 3.6% by weight.

A gaseous mixture of 1,1-dichlorethylene and hydrogen fluoride in a molar ratio of 1:3.5, preheated to 150° C., is passed with a residence time of 10 seconds through the catalyst preheated to 150° C., which is held in a reaction tube. After the reaction gas is washed and dried, a mixture is obtained of:

98.8 vol-percent 1,1,1-trifluorethane
0.2 vol-percent 1,1-difluoro-1-chlorethane
0.2 vol-percent 1-fluoro-1,1-dichlorethane and
0.8 vol-percent 1,1-dichlorethylene.

The reaction temperature along the catalyst layer is 198° C.

The time required for the regeneration of the catalyst is 10 to 15 days. After regeneration the catalyst again had a fluorine content of about 54 wt.-percent.

EXAMPLE 2

Similarly to Example 1, a gaseous mixture of vinyl fluoride and hydrogen fluoride in a molar ratio of 1:1.2, preheated to 150° C., is made to flow with a residence time of 6 seconds through the catalyst of Example 1 heated to 160° C. After the reaction gas is washed and dried, a mixture is obtained of:

95.5 vol-percent 1,1-difluorethane
1.9 vol-percent vinyl fluoride and
0.6 vol-percent of unidentified product.

What is claimed is:

1. In the fluorination of halogenated hydrocarbon containing 2 to 5 carbon atoms with hydrogen fluoride to produce a product having more fluorine substitution than in the halogenated reactant; the improvement which comprises carrying out the reaction in the gas phase at 140 to 400° C. with a residence time of 1 to 40 seconds in the presence of a solid catalyst of aluminum oxide containing 1 to 15 wt.-percent chromium, 42 to 59 wt.-percent fluorine and 6 to 18 wt.-percent oxygen based on the $Al_2O_3$ content thereof, said catalyst prepared by heating aluminum oxide to 50 to 120° C. at a vacuum of less than 1 torr; cooling the aluminum oxide to room temperature under said vacuum, impregnating said aluminum oxide with a chromium salt solution, drying said impregnated aluminum oxide, passing a gas stream containing hydrogen fluoride and air through said impregnated aluminum oxide while increasing the proportion of hydrogen fluoride in said gas but maintaining temperature below 250° C. until said gas is 100% hydrogen fluoride and continuing said hydrogen fluoride treatment for about two additional hours.

2. The process of claim 1, wherein the hydrogen fluoride is present in a mole excess of 1 to 50% referred to the halogenated hydrocarbon reactant.

3. The process of claim 1, wherein the hydrogen fluoride is present in a mole excess of 2 to 15% referred to the halogenated hydrocarbon reactant.

4. The process of claim 1 carried out at 150 to 250° C.

5. The process of claim 1, wherein said catalyst contains 1 to 5 weight percent chromium, 7 to 10 weight percent oxygen and 54 to 58 weight percent fluorine.

6. The process of claim 1, wherein the reactant is a halogenated hydrocarbon.

7. The process of claim 1, wherein the reactant is at least one member selected from the group consisting of vinyl chloride, vinyl fluoride, allyl chloride, 1,1-dichloroethane, 1,1-difluoroethylene, 1,1,2-trichloroethylene, perchloroethylene, 1,1,1 - trichloroethane, 1,1,2 - trichloroethane, hexachlorocyclopentadiene, pentachlorocyclopentadiene.

8. The process of claim 1, wherein air is in admixture with said hydrogen fluoride at the beginning of the treatment of the impregnated aluminum oxide composition with the gas stream and the amount of air in the gas stream is diminished until the exothermic reaction ceases.

9. In the fluorination of a halogenated ketone selected from the group consisting of hexachloracetone, a difluorotetrachloracetone, a trifluorotrichloroacetone tetrafluorodichloroacetone and pentafluorochloracetone with hydrogen fluoride to produce a product having more fluorine substitution than in the halogenated reactant; the improvement which comprises carrying out the reaction in the gas phase at 140 to 400° C. with a residence time of 1 to 40 seconds in the presence of a solid catalyst of aluminum oxide containing 1 to 15 wt.-percent chromium, 42 to 59 wt.-percent fluorine and 6 to 18 wt.-percent oxygen based on the $Al_2O_3$ content thereof, said catalyst prepared by heating aluminum oxide to 50 to 120° C. at a vacuum of less than 1 torr, cooling the aluminum oxide to room temperature under said vacuum, impregnating said aluminum oxide with a chromium salt solution, drying said impregnated aluminum oxide, passing a gas stream containing hydrogen fluoride and air through said impregnated aluminum oxide while increasing the proportion of hydrogen fluoride in said gas but maintaining temperature below 250° C. until said gas is 100% hydrogen fluoride and continuing said hydrogen fluoride treatment for about two additional hours.

References Cited

UNITED STATES PATENTS

| | | | |
|---|---|---|---|
| 2,744,147 | 5/1956 | Milks | 260—653.7 |
| 2,744,148 | 5/1956 | Ruh et al. | 260—653.7 |
| 3,258,500 | 6/1966 | Swamer | 260—653.7 |
| 2,807,646 | 9/1957 | Miller et al. | 260—593 H |
| 2,860,172 | 11/1958 | Woolf | 260—653.7 |
| 3,235,612 | 2/1966 | Anello et al. | 260—653.7 |
| 3,257,457 | 6/1966 | Anello et al. | 260—593 H |
| 3,660,307 | 5/1972 | Scherer et al. | 260—653.7 |

FOREIGN PATENTS

| | | | |
|---|---|---|---|
| 1,000,485 | 2/1962 | Great Britain | 260—653.6 |

DANIEL D. HORWITZ, Primary Examiner

U.S. Cl. X.R.

252—416, 442; 260—648 C, 648 F, 653.6, 653.7

PO-1050
(5/69)

UNITED STATES PATENT OFFICE
CERTIFICATE OF CORRECTION

Patent No. 3,803,241    Dated April 9, 1974

Inventor(s) Ignacio Stolkin and Hans-Joachim Kötzsch

It is certified that error appears in the above-identified patent and that said Letters Patent are hereby corrected as shown below:

Column 3, line 23

"lift" should read "life"

Column 3, line 39

"invvention" should read "invention"

Signed and sealed this 1st day of October 1974.

(SEAL)
Attest:

McCOY M. GIBSON JR.
Attesting Officer

C. MARSHALL DANN
Commissioner of Patents